United States Patent
Miller et al.

(10) Patent No.: US 11,980,806 B2
(45) Date of Patent: May 14, 2024

(54) SKIS WITH REINFORCEMENT LAYER CUTOUT

(71) Applicant: Peak Ski Company, LLC, Bozeman, MT (US)

(72) Inventors: Bode Miller, Bozeman, MT (US); Andrew Wirth, Bozeman, MT (US); Darrin Haugen, Bozeman, MT (US)

(73) Assignee: PEAK SKI COMPANY, LLC, Bozeman, MT (US)

( * ) Notice: Subject to any disclaimer, the term of this patent is extended or adjusted under 35 U.S.C. 154(b) by 0 days.

(21) Appl. No.: 18/131,213

(22) Filed: Apr. 5, 2023

(65) Prior Publication Data

US 2023/0310970 A1    Oct. 5, 2023

Related U.S. Application Data

(60) Provisional application No. 63/453,443, filed on Mar. 20, 2023, provisional application No. 63/327,752, filed on Apr. 5, 2022.

(51) Int. Cl.
*A63C 5/12*    (2006.01)
*B32B 3/26*    (2006.01)
(Continued)

(52) U.S. Cl.
CPC .............. *A63C 5/126* (2013.01); *B32B 3/266* (2013.01); *B32B 15/10* (2013.01); *B32B 15/20* (2013.01);
(Continued)

(58) Field of Classification Search
CPC ......... A63C 5/126; B32B 3/266; B32B 15/10; B32B 15/20; B32B 21/14; B32B 15/085;
(Continued)

(56) References Cited

U.S. PATENT DOCUMENTS 3,734,519 A * 5/1973 Bennett .................... A63C 5/12
441/74
4,706,985 A * 11/1987 Meatto .................... A63C 5/12
280/610

(Continued)

FOREIGN PATENT DOCUMENTS

AT           508022 A4 * 10/2010 ............. A63C 5/003
CN       105056507 A  * 11/2015
(Continued)

OTHER PUBLICATIONS

Philpug, "My Morning with Bode Miller," https://www.skitalk.com/ams/my-morning-with-bode-miller.168/, 6 pages, Jan. 18, 2021.

*Primary Examiner* — James A Shriver, II
*Assistant Examiner* — Michael T. Walsh
(74) *Attorney, Agent, or Firm* — Brownstein Hyatt Farber Schreck, LLP

(57) ABSTRACT

A ski may define a body that defines a tip, a tail opposite the tip, a top sheet, a base extending from the tip to the tail and opposite the top sheet, a core layer positioned between the base and the top sheet, and a reinforcement layer positioned between the top sheet and the base. The reinforcement layer defines an aperture extending through the reinforcement layer and positioned within a first third of a length of the ski, the length defined from the tip to the tail.

19 Claims, 12 Drawing Sheets

(51) Int. Cl.
*B32B 15/10* (2006.01)
*B32B 15/20* (2006.01)
*B32B 21/14* (2006.01)
*B32B 15/085* (2006.01)
*B32B 15/088* (2006.01)
*B32B 27/32* (2006.01)
*B32B 27/34* (2006.01)

(52) U.S. Cl.
CPC ............ *B32B 21/14* (2013.01); *B32B 15/085* (2013.01); *B32B 15/088* (2013.01); *B32B 27/32* (2013.01); *B32B 27/34* (2013.01); *B32B 2307/412* (2013.01); *B32B 2307/54* (2013.01); *B32B 2307/7376* (2023.05)

(58) Field of Classification Search
CPC ....... B32B 15/088; B32B 27/32; B32B 27/34; B32B 2307/412; B32B 2307/54; B32B 2307/7376
See application file for complete search history.

(56) References Cited

U.S. PATENT DOCUMENTS

| | | | | |
|---|---|---|---|---|
| 4,858,945 A | * | 8/1989 | Kashiwa | A63C 5/12 280/610 |
| 5,501,825 A | * | 3/1996 | Jodelet | A63C 5/12 280/610 |
| 7,942,436 B2 | * | 5/2011 | Holzer | A63C 5/003 280/602 |
| 8,020,887 B2 | * | 9/2011 | Riepler | A63C 5/128 280/607 |
| 8,215,659 B2 | * | 7/2012 | Binder | A63C 5/006 280/601 |
| 8,733,782 B2 | * | 5/2014 | Smith | E05D 7/00 16/349 |
| 8,827,301 B2 | * | 9/2014 | Vailli | A63C 5/006 280/610 |
| 2006/0097469 A1 | * | 5/2006 | Nosworthy | A63C 17/01 280/87.042 |

FOREIGN PATENT DOCUMENTS

| | | | | |
|---|---|---|---|---|
| CN | 109646925 A | * | 4/2019 | |
| CN | 110681145 A | * | 1/2020 | |
| DE | 29706716 U1 | * | 6/1997 | ............... A63C 5/03 |
| DE | 19836515 A1 | * | 2/1999 | ............... A63C 5/075 |
| DE | 202018103415 U1 | * | 8/2018 | ............... A63C 5/052 |
| EP | 0622096 A1 | * | 11/1994 | |
| EP | 1175925 A1 | * | 1/2002 | ............... A63C 5/04 |
| FR | 2802438 A1 | * | 6/2001 | ............... A63C 5/075 |
| FR | 2906153 A1 | * | 3/2008 | ............... A63C 5/02 |
| FR | 3013604 A1 | * | 5/2015 | ............... A63C 17/12 |
| KR | 20160045008 A | * | 4/2016 | |
| WO | WO-2020045240 A1 | * | 3/2020 | ............... A63C 17/01 |

* cited by examiner

SKIS WITH REINFORCEMENT LAYER CUTOUT

CROSS-REFERENCE TO RELATED APPLICATION(S)

This application is a nonprovisional patent application of and claims the benefit of U.S. Provisional Patent Application No. 63/327,752, filed Apr. 5, 2022 and titled "Ski with Reinforcement Layer Cutout," and this application is a nonprovisional patent application of and claims the benefit of U.S. Provisional Patent Application No. 63/453,443, filed Mar. 20, 2023 and titled "Ski with Reinforcement Layer Cutout," the disclosures of which are hereby incorporated herein by reference in their entireties.

TECHNICAL FIELD

Embodiments described herein relate to skis.

BACKGROUND

Skiing is a versatile snow sport that allows users to glide over a wide variety of terrain and engage in different activities, such as backcountry skiing, cross-country skiing, freestyle skiing, and so on. To improve performance in each of these activities, modern skis use a variety of materials to impart stiffness while maintaining a durable and light product. However, improving the mechanical properties in certain aspects of the ski often result in tradeoffs in performance in other aspects. Thus, users often have to choose between maneuverability and flexibility or stability and stiffness.

SUMMARY

A ski may define a body having a tail and a tip. The ski may include a tip, a tail opposite the tip, a top sheet, a base extending from the tip to the tail and opposite the top sheet, a core layer positioned between the base and the top sheet, and a reinforcement layer positioned between the top sheet and the base. The reinforcement layer may define an aperture extending therethrough and positioned within a first third of a length of the ski, the length defined from the tip to the tail. The aperture of the ski may be an ellipse.

In some embodiments, the reinforcement layer may be made from an aluminum alloy comprising zinc and magnesium. In some examples, the aperture is a first aperture and the core layer may define a second aperture extending at least partially through the core layer. The aperture may be a first aperture, and the reinforcement layer may be a first reinforcement layer and further include a second reinforcement layer defining a second aperture extending at least partially through the second reinforcement layer. In some embodiments, the second aperture extends through the second reinforcement layer, a third aperture extends through the core layer, and the first, second, and third aperture are aligned with respect to a vertical axis along a thickness of the body. A central axis of the aperture may be aligned with a central axis of the body. A distance between the tip of the ski and a center of the aperture may be larger than a distance between a boot center of the ski to the center of the aperture.

In some embodiments, a ski may include a body with a tip, a tail opposite the tip, a length extending from the tip to the tail, a boot region located in a middle third of the length, a core layer, at least one laminate layer, a first reinforcement layer defining an aperture positioned within a front third of the length and positioned on a first side of the core layer, and a second reinforcement layer positioned on a second side of the core layer, the second side opposite the first side. The aperture of the ski may be a through aperture. In some embodiments, the aperture is an oval, and a center axis of the aperture is positioned asymmetrically with respect to a center axis of the body. Alternatively, the aperture may be an hourglass shape. In some examples, the aperture is a first aperture, the first reinforcement layer defines a second aperture positioned between the tip and the first aperture, and the first and second apertures are symmetrical about a center axis of the body. A first surface area of the first aperture may be larger than a second surface area of the second aperture. In some embodiments, the aperture may be a circle. The first and second reinforcement layers may have a yield strength exceeding 600 MPa. The core layer may be formed from poplar, paulownia, ash, maple, beech, and so on or a combinations thereof. In some examples, the aperture is an ellipse defining a major axis and a minor axis, and the major axis of the aperture is aligned with a central axis of the body.

A reinforcement layer of a ski may include a body defining a tip, a tail, a boot center, an aperture positioned between the tip and the boot center, a first tapered feature having a first narrow end at the tip, and a second tapered feature having a second narrow end at the tail. The reinforcement layer may have a thickness between 0.3 mm and 1 mm.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
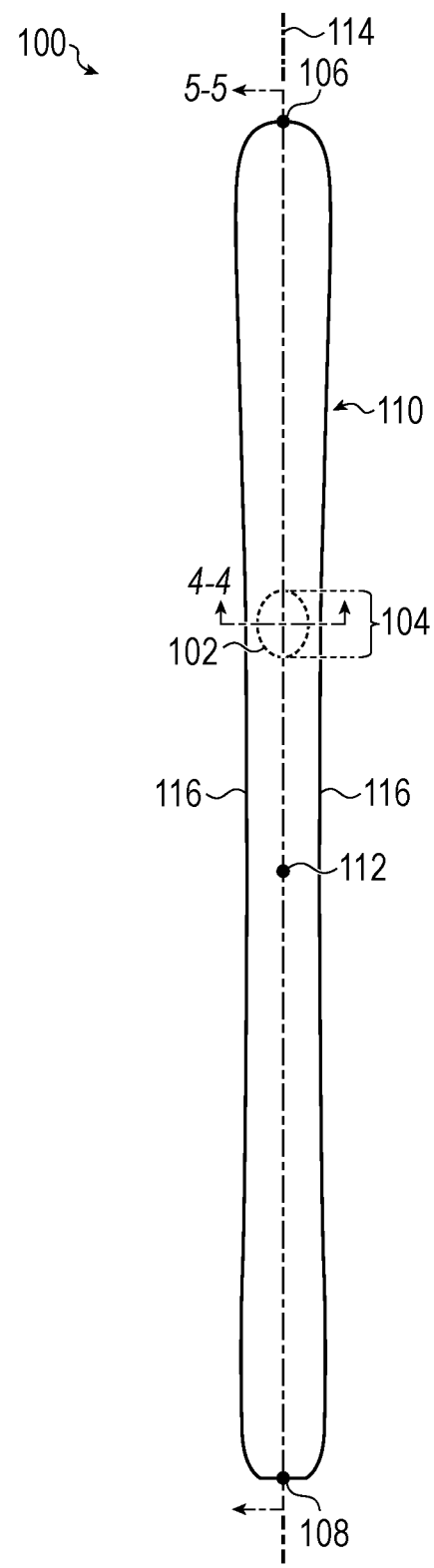
FIG. 1 depicts an improved ski, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to an improved ski and to methods of fabricating the improved ski. The improved ski has an aperture in its reinforcement layer(s) which imparts a variable bending stiffness along the ski. This aperture, or keyhole, may not be present or extend into any other layer of the ski in some embodiments, while in others it may extend into other layers. Thus, in many embodiments, the keyhole or aperture is invisible when viewing an exterior of the ski.

In some embodiments, the aperture is defined somewhere between the boot region of the ski and the tip of the ski to allow the tip of the ski to bend more easily compared to the rest of the ski. Because the tip is able to bend more easily, the ski is more adaptable to changes in terrain and powder conditions. A more compliant tip also allows users to initiate a turn more easily compared to traditional skis of the same length and/or stiffness. The improved ski maintains a large bending stiffness from the aperture to the tail (e.g., where most edging takes place) which provides enhanced stability during turns, for example. Thus, the improved ski is maneuverable and stable.

The performance of a ski depends on a number of mechanical properties, including the stiffness of the ski, the profile or shape of the ski, the length of the ski, the layup of the ski (e.g., the number, thickness, and composition of layers forming the ski), and so on. Each of the mechanical properties change the performance of the ski in ways and affect its performance in other ways. For example, with respect to traditional skis, a length of the ski impacts its stability and turning radius. In general, longer skis are more stable (and have a larger turning radius) than otherwise-identical shorter skis because the force exerted by a user on the ski is spread along a greater length and/or area. Further, longer skis generally have more "float" than shorter skis because a skier's weight is distributed across a larger area. At higher speeds, longer skis typically feel more stable than otherwise-identical shorter skis. Generally, comparisons between two skis of varying lengths (e.g., longer vs. shorter or the like) are between skis that are substantially similar or identical with respect to other mechanical properties.

By contrast, shorter skis are more maneuverable than longer skis. For example, shorter skis generally have a shorter turning radius as the tip of the ski is closer to a skier's boot (e.g., the point at which a skier applies force to initiate a turn). However, shorter skis tend to sink in powder as compared to longer skis and may be more unstable at higher speed. Because of the tradeoffs involved in each ski length, some users opt to purchase multiple skis with different lengths, depending on the chosen activity and current powder conditions.

Embodiments of improved skis as described herein generally incorporate an aperture in a reinforcement layer of the ski layup. This aperture effectively causes the portion of the reinforcement layer to act as a living hinge, effectively shortening the turning radius of the ski while maintaining its stability. As the aperture allows the tip of the ski to bend more easily, it also makes initiating turns easier by requiring less force to do so. In other words, the resistance to a turn traditionally present in the fore portion of the ski is significantly reduced due to the aperture.

Ski stiffness also plays a role in a ski's performance. Skis with lower stiffness have more flexibility, making them better suited for soft snow and slower speeds as well as easier to maneuver. Generally, skis with more flexibility are more forgiving of the terrain and, because the edge of the ski is more compliant, a flexible ski allows a user to turn more easily. By contrast, stiffer skis provide more stability, particularly at higher speeds and for harder snow. Stiffer skis tend to provide better grip because the ski maintains full edge contact with the snow and it is less prone to bouncing.

In some embodiments, the improved skis have a high stiffness along the entire ski except for at the aperture. At the aperture, the bending and the torsional stiffness of the ski decreases. Importantly, the bending and torsional stiffness between the tip and the start of the aperture is high (e.g., comparable to the body of the ski). This difference in stiffness means that the ski will bend at the area with the least stiffness (e.g., the path of least resistance). Thus, the improved ski is forgiving of the terrain (e.g., like a flexible ski) because the tip of the ski is more compliant between the aperture and the tip but the ski feels stable at high speeds due to its stiffness along the body of the ski (e.g., unlike a flexible ski). That is, the aperture effectively permits the portion of the ski between the aperture and the tip (the "front portion") to flex and contour to a surface while maintaining higher rigidity for the portion of the ski between the aperture and the back end of the ski. The front portion may rotate about a centerline axis of the ski while the remainder of the ski does not rotate, or rotates less than the front portion.

Turning to construction, modern skis comprise layers that provide mechanical properties to the skis, thus affecting its performance. For example, many skis include a base, laminate layers, reinforcement layers, a core layer formed from wood, foam or another material, a top sheet, edges, and sidewalls. In some examples, the reinforcement layer contributes a significant portion of the stiffness of the ski. Skis use a variety of reinforcement layer materials or combination of materials, including fiberglass, metal and/or metal alloys, carbon fiber, and so on. Metal alloy reinforcement layers have a high elasticity modulus (Young's modulus) which, along with the shape of the ski, help define the bending stiffness of the ski. While metal alloy reinforcement layers are durable and provide a high level of stiffness, they produce a less compliant ski than those that lack a metal reinforcement layer. In some embodiments, the improved ski leverages the properties of the reinforcement layer (e.g. its high elasticity modulus) and fine tunes the mechanical properties at localized regions to improve the ski's performance.

The embodiments depicted in FIGS. 1-12 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

In some embodiments, improved skis (hereinafter "skis") have an aperture that extends through the reinforcement layer. This aperture can be any suitable shape which reduces stress concentrations factors (e.g., those present due to sharp transitions, such as those in the prior art). For example, the aperture can be an oval, a circle, an hourglass, a stadium, an ellipse, or any suitable shape or combination of shapes. In some examples, the shape of the aperture has a rounded profile, particularly at corners or intersections, which help distribute the stress across the reinforcement layer and reduces the stress concentrations factors at those locations. Typically, although not necessarily, the aperture is symmetric about a centerline axis of the ski running from a center of the tip to a center of the tail of the ski. As a result of this geometry, when force is loaded onto the ski, the force and resulting stress is symmetrically distributed with respect to a centerline of the ski. The ski, in turn, flexes according to its lateral rigidity. Because the ski is less laterally rigid along the portion of the ski in which the aperture is located, this aperture portion of the ski bends to a greater extent than the rest of the ski, such that the aperture portion acts as a living hinge. Thus, under stress, the ski bends more along its aperture portion than it does from the aperture to the tip or the aperture to the base.

FIG. 1 shows a plan view of a ski. As described above, the ski 100 has a keyhole 102 which decreases the bending and torsional stiffness of the ski at the aperture area 104. By decreasing the bending and torsional stiffness, the tip 106 of the ski is more compliant, thereby bending more easily. Due to this geometry, a user can make tighter turns without sacrificing the stability of the ski. Here, the keyhole 102 is defined only in one or more internal layers of the ski and so is shown in phantom as it is not visible in the plan view of FIG. 1.

More generally, the ski 100 has a body 110 which defines a tip 106 and a tail 108 of the ski. The tail 108 is opposite the tip 106. The tip 106 may be rounded when viewed in plan (although this is not necessary) and may likewise curve upwardly (see, e.g., FIGS. 5-6), such that a base of the ski is convexly curved and a top of the ski is concavely curved. In some embodiments, the tail 108 has slightly rounded sidewalls and a straight terminus, while in other embodiments the tail may be fully rounded like the tip. The tail may curve in a manner similar to the tip, may be less curved, or may be substantially flat. While the shape of the ski is described with respect to a particular geometry, other shapes are possible. For example, other embodiments include alternative configurations or combinations, including a twin-tip design, a swallowtail design, and so on. Likewise, a sidecut of the ski may vary substantially from no sidecut at all to extreme sidecuts. The ski may further be cambered, rockered, or the like. Generally, it should be understood that the geometry of the ski or skis may vary according to industry standards while incorporating an aperture (or "keyhole") as described herein.

The keyhole 102 is located between the tip 106 and the boot center 112 (e.g., a center point between front and rear bindings above which a center of a ski boot is located when a boot is mounted to the ski). In some embodiments, the keyhole 102 is positioned within a first third of a length of the ski measured from the boot center 112 to the tip 106, along the centerline axis 114 of the ski. In other embodiments, the keyhole 102 is located within a first fifth, a first fourth, a first half, or any other suitable position. The position of the aperture defines how compliant the tip of the ski is with respect to the rest of the ski. For example, an aperture within the first fifth of the length of the ski has less deflection at the tip than an aperture within the first third of the length of the ski. It should be appreciated that the keyhole 102 may be located closer to the ski tip 106 than the boot center 112 in many embodiments, although it is shown and described herein as being closer to the boot center than the ski tip.

In some embodiments, the keyhole 102 has an oval or an elliptical cross-sectional shape when viewed in plan, as shown in FIG. 1. An "oval" shape refers to a shape with a simple, smooth, convex closed plane with one or two axes of symmetry. An "elliptical" shape or "ellipse" refers to a closed curve that results from the intersection between a conic surface and a plane surface. Elliptical shapes are subsets of oval shapes.

In some embodiments, the aperture defines a major axis and a minor axis. As shown in the figure, the major axis of the keyhole 102 is aligned to the centerline axis 114 of the ski. In some examples, the major axis is approximately 70 mm, 80 mm, 90 mm, 100 mm, 120 mm, or any suitable length. The length of the axis depends on the overall length of the ski, the material of the reinforcement layer, the type of ski (e.g., power or backcountry ski, all-mountain, and so on). Similarly, the minor axis of the keyhole 102 is perpendicular to the major axis and to the centerline axis 114 of the ski. The minor axis is approximately 50 mm, 60 mm, 70 mm, 80 mm, 100 mm, or any suitable length.

The overall dimensions of the keyhole 202 affect the stiffness of the ski at the aperture area. Without changes in dimensions or materials, skis with a larger aperture have lower stiffness at the aperture area than skis with a smaller aperture. In other terms, skis with a larger aperture are more flexible and/or compliant at the tip. The shape of the keyhole results in a progressive decrease of the ski's stiffness at the widest part of the keyhole (along the width) and the stiffness increases as the aperture narrows (e.g., the stiffness increases toward ends of the keyhole). As discussed above, other shapes of the keyhole, such as a circle, a parabolic shape, a stadium, a polygon with rounded corners, an hourglass, a teardrop, and so on, are also contemplated. One such alternative shape is described below with respect to FIG. 2.

In some embodiments, the aperture is asymmetrical with respect to the centerline axis 114 of the ski. For example, the major axis of the keyhole 102 can be offset with respect to the centerline axis 114. As another example, a shape of the keyhole 102 may be different on one side of the centerline axis 114 from a shape on the other side of the axis. In such configurations, the torsional stiffness of the ski varies depending on the direction of twist. The asymmetrical configuration can allow the torsional stiffness to be fine turned. For example, the torsional stiffness may be smaller on an outside portion or edge of the skis than an inside portion or edge of the skis, or vice versa. This varying torsional stiffness can allow the skis to bend easier outwardly than inwardly or the reverse.

In some embodiments, the ski has multiple apertures positioned along a forebody of the ski (e.g., a portion of the ski extending from the boot center 112 to the tip 106). For example, some skis include a second aperture positioned between the tip 106 and the first keyhole 102. In this embodiment, during a loading event of the ski (e.g., initiating a turn), the forebody of the ski will preferentially bend at portions incorporating or corresponding to the two apertures ("aperture areas"). Multiple apertures distribute the deflection of the ski among the aperture areas due to the lower stiffness at each of the aperture areas. In some cases, the second aperture is smaller than the first aperture. In other cases, the first aperture is smaller than the second aperture. In still other examples, the multiple apertures are the same size. The size of the aperture determines the stiffness of the ski at the aperture area and how compliant the ski is at each of these apertures. Thus, with multiple apertures of different sizes, the ski will bend the most at the largest aperture and the least at the smallest aperture, as an example.

The shape of the aperture also affects the behavior of the ski 100. For example, an elliptical, circular, or oval aperture yields varying stiffness along the aperture area, with a minimum stiffness at the part of the aperture area corresponding to a widest part of the ellipse, circle, or oval. Thus, the stress is most concentrated at this point and the ski will bend uniformly with respect to this aperture area. By contrast, where an hourglass shape aperture is incorporated, the bending stiffness has two minimums—one at each end of the keyhole, each corresponding to regions where the keyhole is largest in cross-section as measured across a top surface of the ski. Thus, the ski will preferentially and/or initially bend at these two minimums. Also, the torsional stiffness may vary depending on the load condition due to the shape of the hourglass along the ski. Longer apertures result in a longer area of deflection and shorter apertures result in larger stress concentrations. Also, the radius of the apertures also affect the stress concentration factors along the apertures. For example, a small radius results in a larger stress concentration than a larger radius.

In some embodiments, the ski body 110 defines a sidecut 116 along a portion of the sides of the ski. The profile of the sides of the ski defines a radius or a series of radii along the side, with the narrowest portion within the boot region of the ski. In traditional skis, deeper sidecuts generally allow users to initiate turns easier yet can feel unstable, particularly at faster speeds, because of the ski's tendency to veer to the sides due to its shape. By contrast, a shallower sidecut gives users more stability in the ski but can increase the turn radius. In some embodiments, the ski 100 has a shallower sidecut yet it does not sacrifice its turn radius. As a result of the aperture, the forebody of the ski is more compliant and turns initiate easier. This configuration allows a user to edge and/or throw (or "smear") the skis across a hill during a turn because the force needed to change the direction and/or angle of the tip is decreased. The shallower sidecut of the ski 100 maintains the stability of the ski, decreasing the veering tendency compared to deeper sidecuts. While a shallower sidecut is described, other depths of the sidecut are contemplated.

Figure 2:
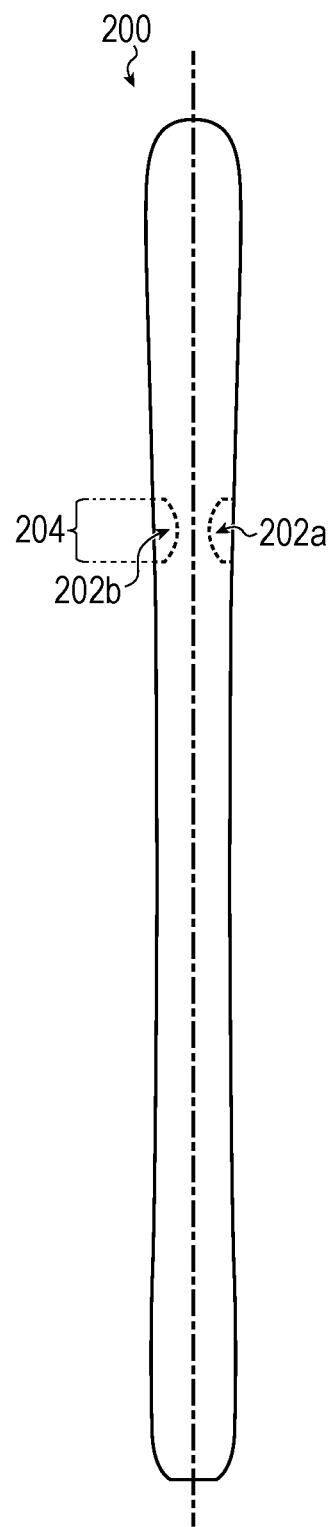
FIG. 2 depicts another embodiment of an improved ski, such as described herein.

FIG. 2 is a plan view of another embodiment of a ski 200 incorporating multiple keyholes 202a, 202b. In the ski 200 shown in FIG. 2, however, the keyholes 202a, 202b are removed from the sides of a metal reinforcement layer of the ski (or a reinforcement layer made of any other suitable material), leaving a waisted bridge or segment rather than being formed in an interior of a metal reinforcement layer. This concentrates stresses on the corresponding portion 204 of the ski 200 in the bridge and permits greater torsional rotation about the bridge than a keyhole formed in an interior of a metal reinforcement layer, potentially allowing faster turn initiation and shorter turns than the ski shown in FIG. 1. Accordingly, it should be understood that some keyholes 202a, 202b may change a shape of a ski's sidewall rather than being completely internal to a ski's layer. Likewise, it should be understood that a keyhole may be formed in any layer of a ski and not simply a reinforcement layer (whether metal or otherwise). As with the embodiment of FIG. 1, the keyholes are shown in phantom as they are not visible from a top view of the ski.

Figure 3:
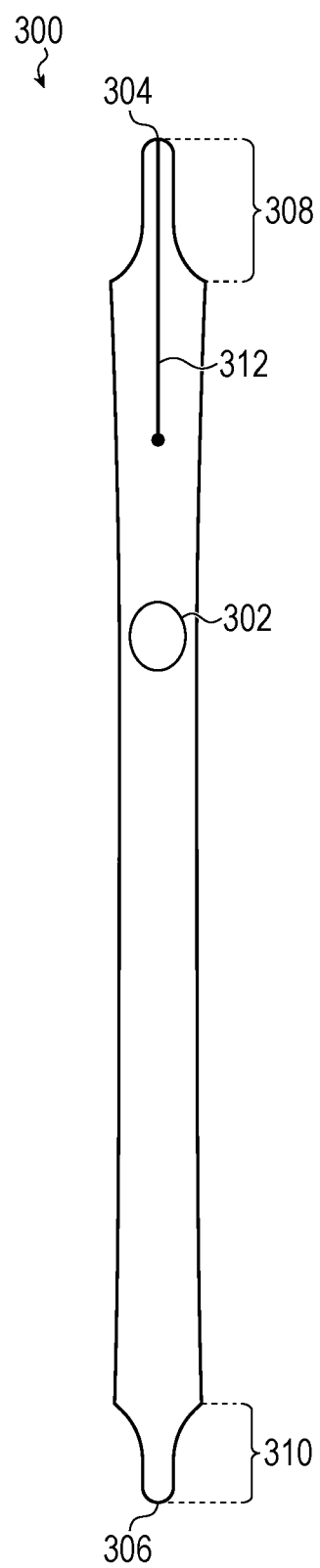
FIG. 3 depicts a reinforcement layer of an improved ski, such as described herein.

FIG. 3 shows a plan view of an example reinforcement layer 300. The reinforcement layer 300 approximates the general shape of the ski, in some embodiments. The reinforcement layer 300 defines an aperture 302, similar to keyhole 202 described above. In some embodiments, the aperture is a through aperture. The reinforcement layer 300 can also define additional features 308 and 310 along the tip and the tail of the ski, respectively. Features 308 and 310 define a taper that narrows towards the tip 304 or the tail 306. These features 308 and 310 further define the stiffness of the ski along the cross section of the ski. For example, the narrower portions (e.g., at features 308 and 310) result in a reduced bending and torsional stiffness at the tip and the tail. Similar to the aperture, the features 308 and 310 have rounded profiles to reduce stress concentrations along the reinforcement member. In some embodiments, the reinforcement member has a longitudinal slit 312 along a portion of the centerline axis, such slit helps to further tune the stiffness and dampening effects of the ski along the ski profile. More broadly, the reinforcement layer may have an aperture combined with one of more features, longitudinal slits, without any features (e.g., uniform along its width), or any combination thereof.

Figure 4:
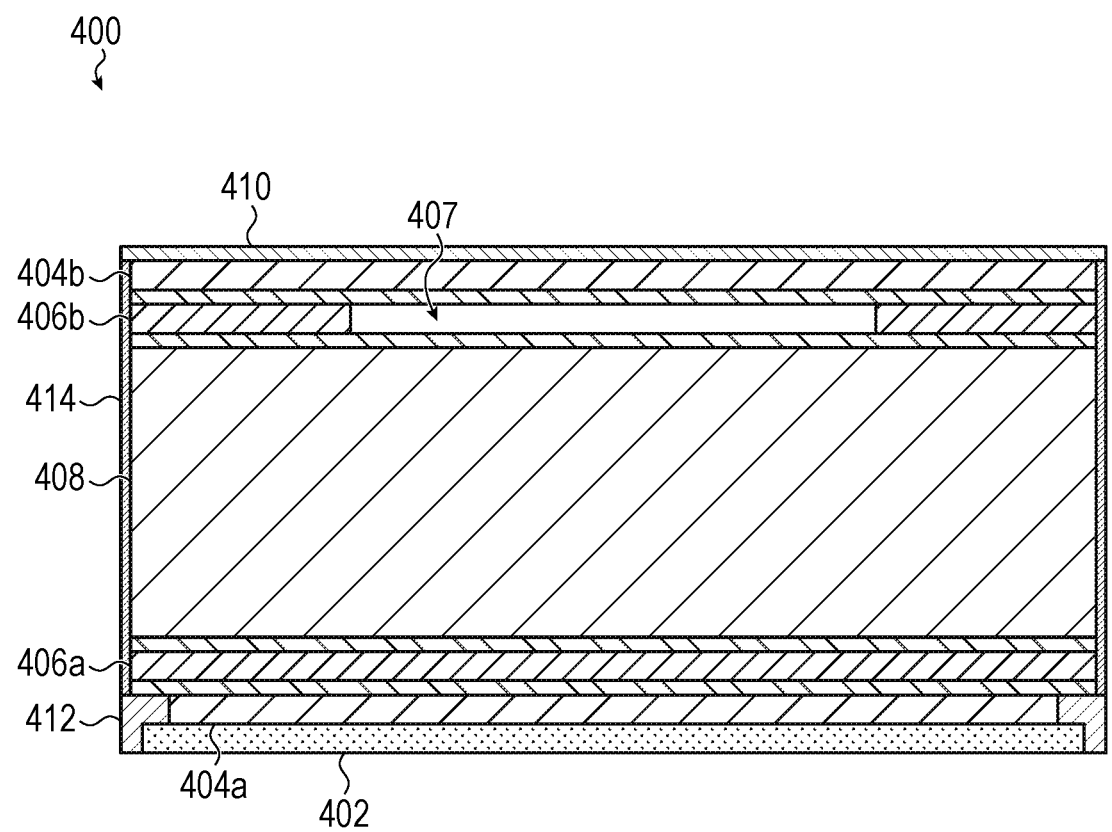
FIGS. 4-5 depict cross-sections of an improved ski, such as described herein.

FIG. 4 is a cross-sectional view of the ski 200 taken along line 4-4 of FIG. 1. The ski 400 has a laminar structure. Each layer of the ski imparts different mechanical properties which enhance the performance and the durability of the ski. In some embodiments, the ski has a base layer 402, at least one laminate layer 404a, 404b, at least one reinforcement layer 406a, 406b, a core layer 408 (also called a "core"), a top layer 410, an edge 412, and a sidewall 414. The base layer 402 is configured to interface with the ground. In general, the base layer may be made from plastic (e.g., polyethylene plastic with a high molecular weight) or any other suitable material to interface with snow and with sufficient abrasion resistance to interact with the terrain, as may be known to one of skill in the art. The base material can be sintered, extruded, or manufactured in any suitable way.

The reinforcement layers 406a and 406b provide significant stiffness for the overall ski 400. In some embodiments, the reinforcement layer 406a does not have an aperture and reinforcement layer 406b has an aperture 407. In other embodiments, both reinforcement layers 406a and 406b have apertures that are substantially aligned with respect to a vertical axis (e.g., through the thickness of the ski). In some embodiments, the reinforcement layer is made from Titanal. Titanal is an aluminum alloy that has zinc, magnesium, and other alloying elements that impart an exceptionally high yield strength. It has a high bulk modulus and extremely high yield strength compared to other aluminum alloys and to most metal alloys. In some embodiments, the yield strength of Titanal exceeds 600 MPa. Titanal also has excellent damping properties. For example, due its ability to absorb energy and density, Titanal increases the ski's dampness. The Titanal layer imparts a large percentage of the bending and torsional stiffness of the ski, which improves power transmission of the ski along its length. Due to the isotropic nature of Titanal, the bending and torsional stiffness are generally uniform and depend on the shape of the reinforcement layer. In some embodiments, each Titanal layer ranges from 0.3 mm to 1.2 mm. In other embodiments, other thicknesses are contemplated.

As discussed above, when the reinforcement layer has an aperture, the bending and torsional stiffness decreases along the portion of the ski within the aperture. In this configuration, the stiffness of the reinforcement layer can be fine-tuned without altering the material properties of the Titanal. In some embodiments, the reinforcement layer is made of other metals, metal alloys, carbon fiber, composite materials, or any combination of materials. Isotropic and anisotropic materials are contemplated. In some embodiments, the reinforcement layers are different materials.

In some embodiments, the core layer 408 is the thickest part of the ski. The core may be a wood layer, though in some embodiments the core may be made from other materials such as foam. The core layer 408 cooperates to impart flexibility, energy storage, and damping to the skis. In some embodiments, the core layer is made of wood. For example, the wood material is one or a combination of paulownia, poplar, ash, bamboo, aspen, maple, and so on. In other examples, the core is a single material. In other embodiments, the core is made of a composite material, a foam material, or any suitable material or combination of materials. For example, the core may be a polyurethane foam reinforced with continuous glass fibers. As another example, the core is a combination of different types of wood (e.g., poplar and paulownia) and composite materials (e.g., polyurethane foam reinforced with continuous glass fibers). As shown in the figure, the core layer 408 is sandwiched between reinforcement layers 406a and 406b. This sandwich construction protects the core layer 408 from failure, particularly during high loading (e.g., high deflections) during use. However, other placements of the core layer relative to other layers are contemplated.

In some embodiments, the laminate layer(s) 404a, 404b is made from fiberglass. Fiberglass contributes to the stiffness of the overall ski and is a flexible yet responsive material. In some embodiments, the fiber is pre-impregnated with a resin (e.g., epoxy) prior to assembling the skis. In other embodiments, the resin is manually applied during the assembly process. The fiberglass is generally woven as a bi-axial wrap or a tri-axial wrap. This weave of the fiberglass imparts different properties (e.g., torsional stiffness) to the ski. The laminate layer(s) 404a, 404b can also be made from other materials, such as carbon fiber and aramid (Kevlar). As shown in the figures, the laminate layers 404a and 404b are adjacent to the base layer and the top layer, respectively. The number and position of the laminate layers can vary based on the type of ski, material, and so on.

Generally, the top layer 410 and the sidewall 414 protect the inside layers of the skis and interface with the outside environment. In some embodiments, the top layer 410 is made from visually transparent plastic, plastic, nylon, composites, foil, or any suitable materials or combinations of materials. The sidewall 414 is positioned between the top layer 410 and the edge 412 and can be made of plastic or any suitable material or combination of materials that protect the inside layers of the ski and are abrasion and/or impact resistant. While this construction is shown, other constructions are possible. For example, in other embodiments, the top layer 410 extends from the top portion of the skis and along the sides of the skis, without a separate sidewall layer. In yet another embodiment, the sidewall is placed on portions of the ski (e.g., central to the ski) and the top layer covers other portions of the side of the ski.

The edge 412 of the ski 400 is made from steel, steel alloys, metal alloys, or any suitable materials or combination of materials. The edge 412 of the ski can fully or partially wrap around the ski and at least partially contacts the ground. The edge 412 can have different angles depending on the level of skill and type of skiing. Combined with the aperture in the ski, the edge can facilitate edging and/or carving down a hill.

In some embodiments, to fabricate or construct the skis, each layer of the ski is stacked and pressed to shape the ski. For example, the base layer is positioned first and a first laminate layer is positioned over the base layer. As explained above, the laminate layer can be pre-impregnated with a resin or the resin is applied after positioning over the base layer. In some embodiments, the reinforcement layer is positioned over the first laminate layer, the core layer is positioned over the first reinforcement layer, and the second reinforcement layer is positioned over the core. This second reinforcement layer has an aperture, as discussed above. In some embodiments, the aperture is positioned within a first third of the length of the ski (measured from the tip of the ski). The aperture can be pre-drilled prior to assembly of the ski or it can be drilled in place. In some embodiments, the core layer and at least one of the reinforcement layers also define an aperture. These apertures can also be pre-drilled and aligned or drilled in place. A second laminate layer is positioned over the second reinforcement layer, and a top sheet is positioned over the second laminate layer. A resin, such as epoxy, can be placed in between each of these layers to adhere the ski. Sidewalls and the edge are also placed over the sides of the assembly. Once the layers are assembled, the assembly is pressed and heated to cure and/or adhere the layer and define the overall shape of the ski. In some embodiments, the ski is machined to remove excess resin and to fine tune the shape.

Figure 5:
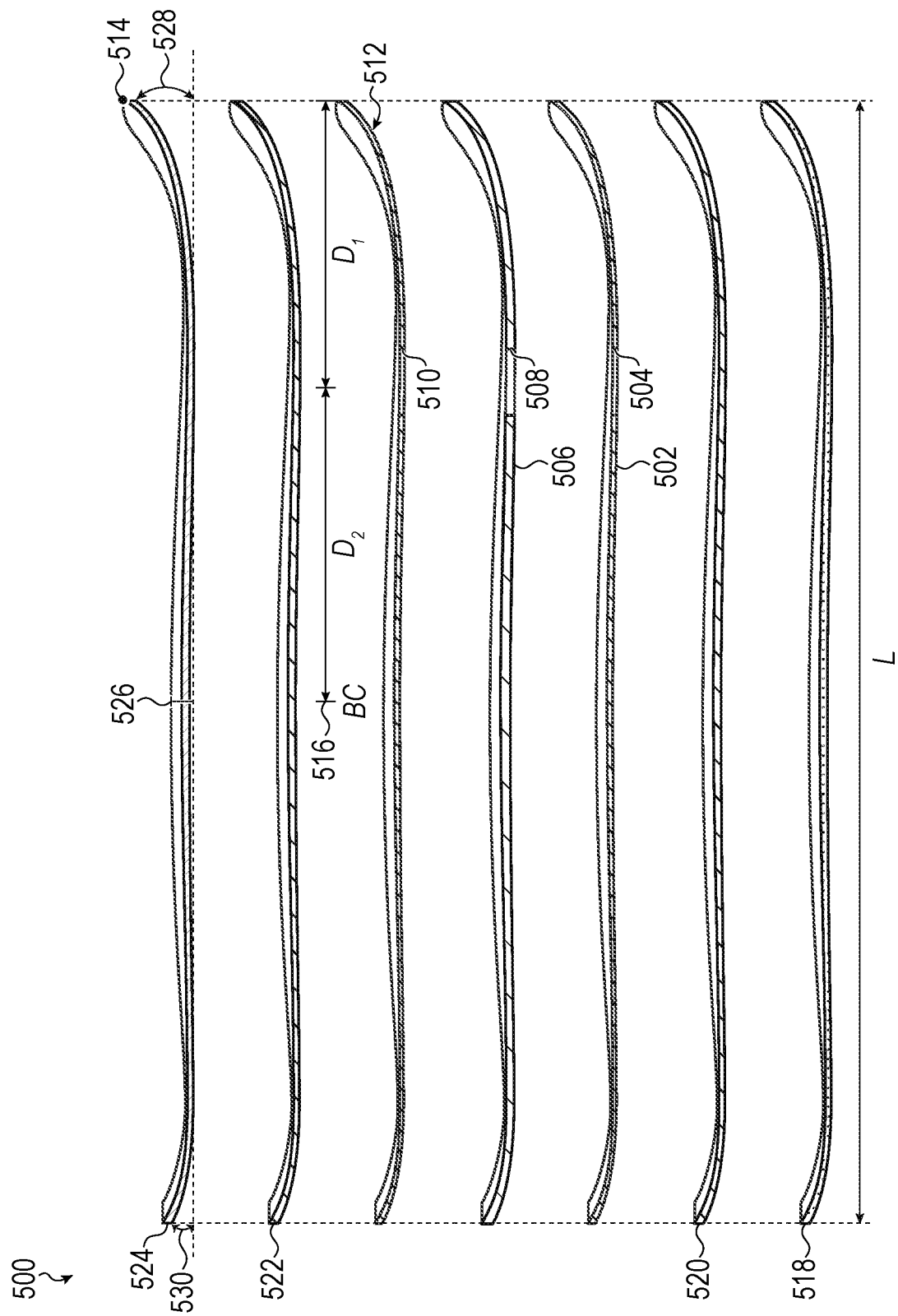

FIG. 5 shows cross sectional view of the ski along line 5-5 from FIG. 1 (along the length of the ski). The cross section shown is an embodiment of the ski from FIG. 1, different from the embodiment shown in FIG. 4. The side layers, such as the sidewall and the edge are not shown for clarity. As shown in the figure, a ski 500 includes an aperture 504 through the first reinforcement layer 502, an aperture 508 through the core layer 506, and an aperture 510 second reinforcement layer 512. In some embodiments, apertures 504, 508, and 510 are substantially aligned along an axis substantially parallel to the thickness of the ski. The apertures are the same dimensions, in some examples. However, apertures of different sizes and shapes are contemplated. While the apertures are shown as through apertures, in other examples the aperture(s) extend partially through the second reinforcement layer or partially through the core. An aperture in each the first reinforcement layer, the core, and the second reinforcement layer results in a lower bending and torsional stiffness around the aperture area and a more compliant tip 514.

The position of the aperture, such as aperture 504, 508, and/or 510 is between the boot center 516 and the tip 514. More specifically, the aperture is a distance D1 measured from the tip 514. In some embodiments, the ratio of D1 over the length of the ski L can be one half, one third, one fourth, one fifth, and so on. The ratio D1/L and distance D1 varies depending on the size of the ski and the type of skiing. Similarly, the dimensions of the aperture (e.g., the width, length, diameter, and/or shape) varies depending on the size of ski and the type of skiing, in some examples. For example, larger skis have a larger apertures than shorter skis to achieve a similar flexibility of the tip. As D1 increases, the flexibility of the tip increases. Similarly, the distance D2 between the boot center and the aperture can be one third, one fourth, one fifth, one eighth of the length of the ski, for example. As D2 decreases, the flexibility of the tip increases.

The base layer 518, the first laminate layer 520, the second laminate later 522, and the top layer 524 sandwich the layers with the aperture and generally do not have an aperture. While each layer is shown to span the entire length of the ski, in other embodiments each layer varies in length.

As shown in the figure, the ski defines a camber 526, a tip rocker 528, and a tail rocker 530. The camber 526 refers to the profile of the ski having an upward arc along the length of the ski which impacts springiness and pop to the ski. As shown in the figure, the aperture can be placed within the upwards arc of the ski. In alternative embodiments, the ski 500 defines a reverse camber. The tip rocker 528 and the tail rocker 530 refer to the upward curve at the tip and the tail, respectively, which creates a gap between the ground and the tip and/or the tail. This shape generally makes the ski more maneuverable. The tip rocker 528 and the aperture cooperate to provide the user with easier turn initiation because the tip is more compliant, which gives the user more control over the skis because the effective length of the ski feels shorter to the user.

Figure 6:
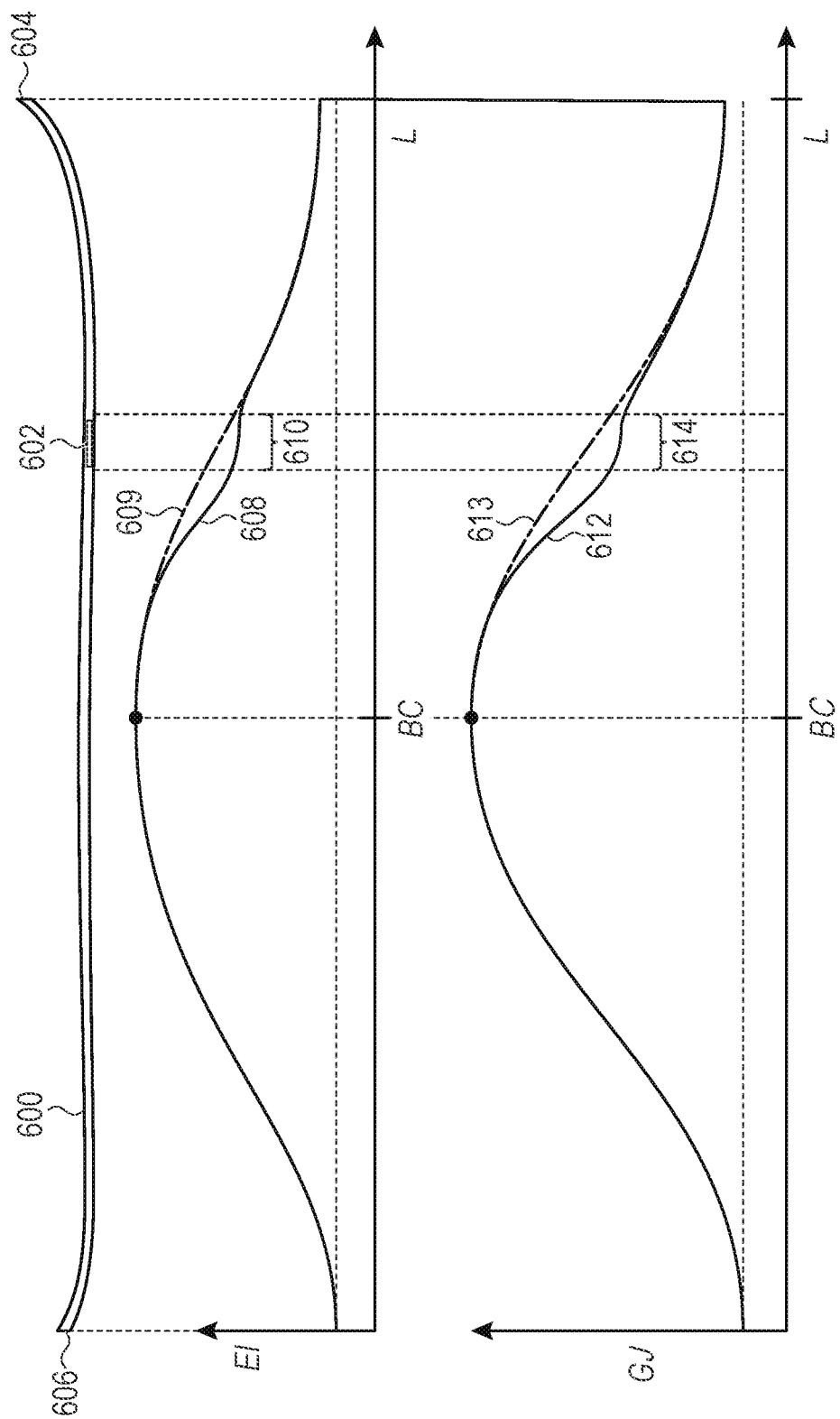
FIG. 6 depicts an improved ski bending stiffness and torsional stiffness plots, such as described herein.

FIG. 6 shows an example of the ski with a keyhole and a simplified plot of the bending stiffness and the torsional stiffness of the ski along the length of the ski 600. During a loading condition, the ski with the keyhole bends and/or twists more than a traditional ski because of the change in bending stiffness (EI) and torsional stiffness (GJ) at the aperture area 602. By contrast, in a traditional ski without an aperture, a same loading condition would result in a more distributed load along the forebody of the ski and thus a less compliant tip for the same amount of force applied.

FIG. 6 shows simplified graphs of bending stiffness (EI) and torsional stiffness (GJ) along the length of a ski measured from boot center BC; the X axes of both graphs are the length of the ski as measured from the tail to the tip of the ski while the Y axis of each graph is ski stiffness, either bending in the top graph or torsional in the bottom graph. Referring initially to the bending stiffness graph, curve 608 corresponds to a bending stiffness of the ski having a keyhole 602 defined therein, while curve 609 corresponds to a bending stiffness of a ski without any keyhole. For comparison purposes, the ski with the keyhole and the ski without the keyhole have the same dimensions, including their cross-sections. Thus, at a rear portion of the ski (e.g. from boot center to the tail 606) and a fore portion of the ski (e.g., after the aperture towards the tip 604), curves 608 and 609 overlap, indicating the bending stiffnesses of the ski with and without a keyhole are identical along a majority of the ski's length from tip to tail.

As depicted by curve 608, the bending stiffness near the keyhole 602 decreases at a faster rate than the bending stiffness of the a ski of similar cross section without the aperture (e.g., line 609). At location of the keyhole along the ski, the bending stiffness curve 608 defines an inflection 610 where the bending stiffness decreases compared to that of the ski without the keyhole. The overall bending stiffness along the portion of the ski in which the keyhole is defined is, in some embodiments, approximately 20% less than the bending stiffness of the keyhole-free ski. Thus, the forebody of the ski is more flexible, elastic, and/or compliant due to the keyhole. The keyhole permits the ski to bend further when the same force is exerted on a keyhole-inclusive ski as compared to a keyhole-free ski, allowing easier and quicker turn initiation and shorter radius turns.

Similarly, curve 612 represents the torsional stiffness (GJ) along the length of a ski having a keyhole defined therein while curve 613 represents the torsional stiffness of an otherwise identical ski without the keyhole. As shown, the torsional stiffness of the ski decreases in a step-like manner near the keyhole, as represented by inflection 614 on the curve 612, which indicates a softening of the ski under torsion. By contrast, the torsional stiffness of a similar ski without the keyhole lacks this step-like decrease and instead is a relatively smooth function along the ski's length. Thus, the torsional stiffness of a ski at the keyhole region of the ski is lower than the torsional stiffness at the same region of an otherwise-identical ski lacking a keyhole. As discussed above, the aperture provides a more compliant tip in a bending and in a torsional direction, making it easier for a user to initiate turns and make shorter radius turns.

In other words, at the aperture 602, the ski is more flexible and/or elastic because of the change in geometry (and thus a change in the second moment of area and in the polar moment of inertia) at the reinforcement layer. As explained above, the reinforcement member can include material with high modulus of elasticity. Thus, the deformation of the ski at the aperture is elastic, in some embodiments. Because the reinforcement layer imparts a significant portion of the stiffness of the ski, a change in geometry in this layer causes a change in the bending stiffness and an increase in elasticity.

Figure 7:
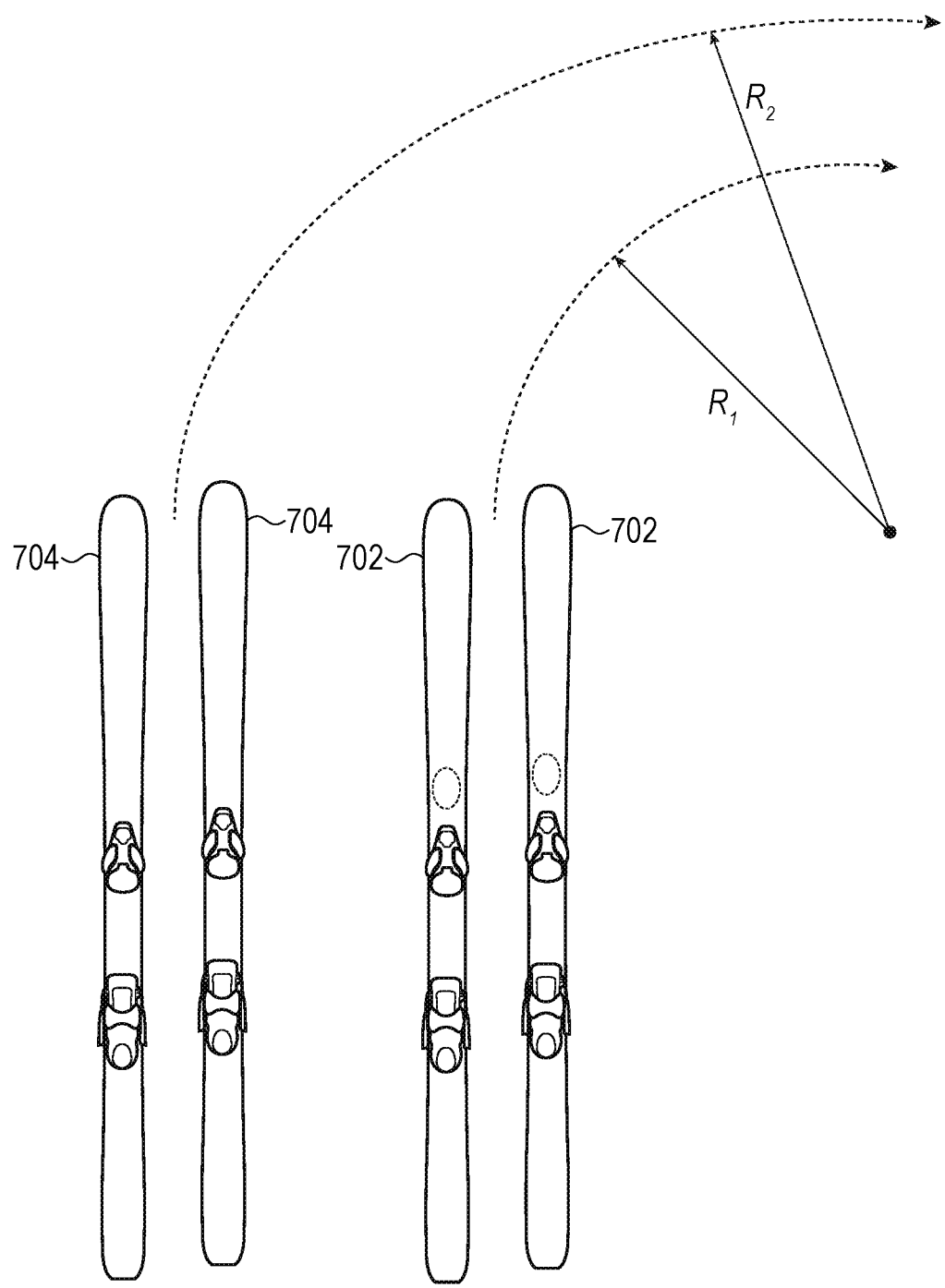
FIG. 7 depicts an example turning radius of an improved ski, such as described herein.

FIG. 7 shows a comparison of a ski 702 with an aperture, as described in this disclosure, to a traditional ski 704. As shown in the figure, the ski 702 has a shorter turning radius R1 than the turning radius R2 of the traditional ski 704. For purposes of this comparison, the length and shape of the skis are substantially the same. When a user in traditional skis initiates a turn, the user has to apply significant force to change the course of the skis (e.g. proportional to the lever between the boot binding and the tip). With an aperture, the lever decreases because a more compliant tip allows the initiation of the turn easier. As a result, a user can perform sharper turns (e.g., by edging or smearing).

Some skis may include a tracking device configured to permit a skier to find the ski when he or she is separated from it. This may be useful, for example, at the base of a ski area where many pairs of similar skis are present, when a skier loses a ski on a mountain (especially if the ski is covered in snow), to determine where a ski is stored, if a ski is stolen, and the like. The tracking device may communicate with a mobile device, such as a mobile phone or other computing device, a key fob, a dedicated hardware element, or the like to provide information on a ski's location. The tracking device may include a Global Positioning System (GPS) transceiver or receiver to provide GPS coordinates of the ski to the mobile device and thus to the skier. The tracking device may be rechargeable, either directly or wirelessly. Generally, the tracking device is incorporated within a ski (e.g., between a base and top layer of the ski) rather than attached or affixed to a surface of the ski. This makes it more difficult for the tracking device to be accidentally or deliberately separated from the rest of the ski.

Figure 8:
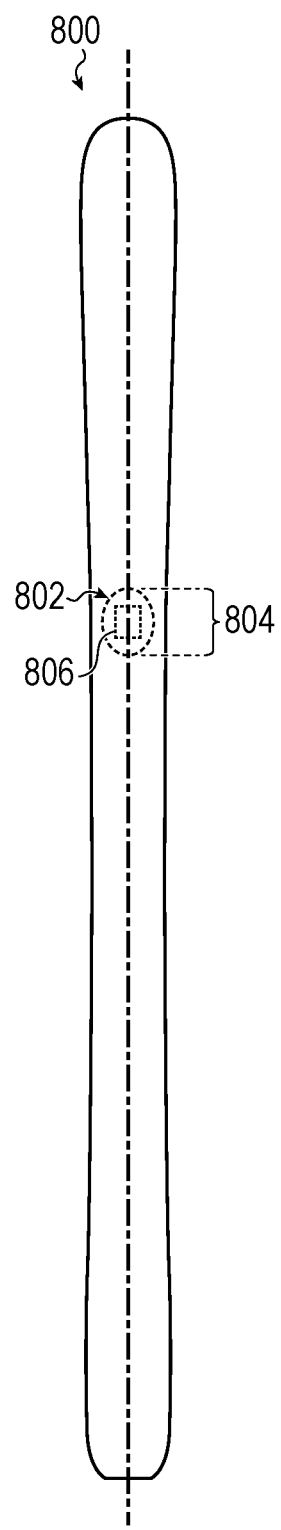
FIG. 8 depicts an example of an improved ski incorporating an electronic tracker in an aperture in a reinforcement layer of the ski.

FIG. 8 shows an example ski 800 having a keyhole 802 located in a portion 804 of the ski, as in other embodiments described herein. In this embodiment, however, a tracking device 806 is positioned at least partially within the keyhole 802 and so it is at least partially surrounded by the layer of the ski in which the keyhole is formed (such as a reinforcement layer, whether made from metal, carbon fiber, fiberglass, or another material). The keyhole 802 may still provide any or all of the benefits described herein, including shortening turning radius of the ski 800, providing enhanced stability of the ski 800 as compared to a shorter ski having the same turning radius, easier initiation of turns, return of energy at the end of a turn, and so on, while providing internal volume that may be used to hold the tracking device 806. Further, positioning the tracking device 806 in the keyhole 802 may permit the tracking device to be incorporated into the ski without any visible (or at least a reduced) protrusion, bump, or the like that indicates the position and presence of the tracking device 806 as well as providing a location for a third party to dig into the ski to remove the device 806.

Figure 9:
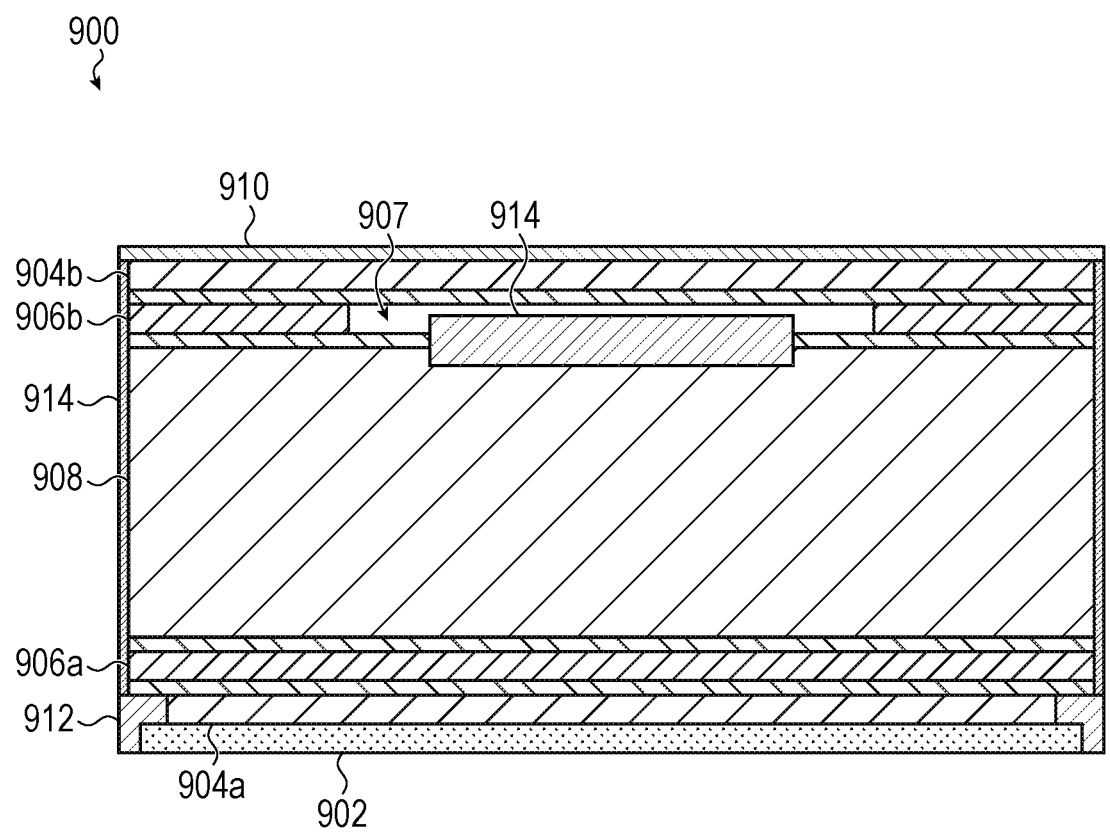
FIG. 9 is a cross-sectional view of the improved ski incorporating the electronic tracker, taken along a centerline axis of the ski.

Depending on the dimensions of the tracking device, it may be fully or partially encompassed within a thickness of the keyhole 802 and the reinforcement layer (or other layer) in which the keyhole is formed. FIG. 9, for example, is a cross-section of a ski 900 showing a number of layers 902, 904a, 904b, 906a, 906b, 908, all of which generally correspond to the layers described with respect to FIG. 4. As in the ski of FIG. 4, the ski 900 includes a keyhole or aperture 907 formed in a reinforcement layer 906b. Further, a tracking device 914 is positioned at least partially within the keyhole 907. Here, the tracking device 914 is thicker than the reinforcement layer 906b. Accordingly, the tracking device 914 extends into another layer adjacent the reinforcement layer 906b (here, a core 908, although it may extend into any adjacent layer as well as non-adjacent layers). In other embodiments, the tracking device 914 may be fully encompassed within the reinforcement layer 906b or other layer in which the keyhole 907 is formed.

Figure 10:
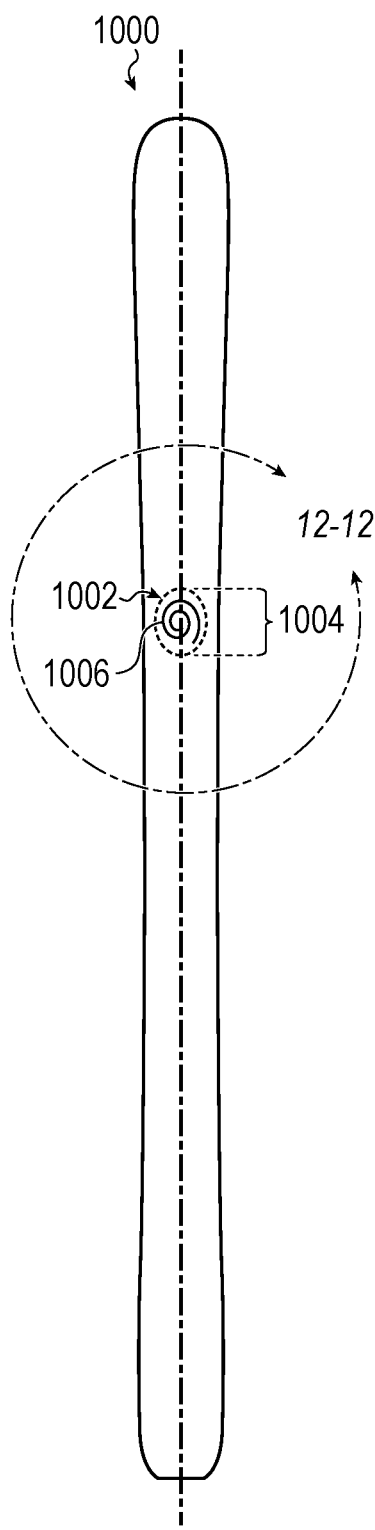
FIG. 10 depicts an example of an improved ski incorporating an inductive charger positioned in an aperture in a reinforcement layer of the ski.

While a port or other access may be included in a ski to permit the tracking device to be recharged, it is often useful to wirelessly recharge the tracking device instead. Not only can wireless recharging be more convenient but it also removes a potential ingress for water or moisture, thereby shielding the tracking device and its charger. FIG. 10 illustrates a ski 1000 having a keyhole 1002 in a portion 1004 of the ski and a wireless charger 1006 positioned within the keyhole. The wireless charger 1006 may be an inductive charger, for example. Further, because the reinforcement layer from which the keyhole 1002 is made may be metal, the reinforcement layer may act as a shield to prevent extraneous signals or noise from reaching the wireless charger 1006 and/or the tracking device.

Figure 11:
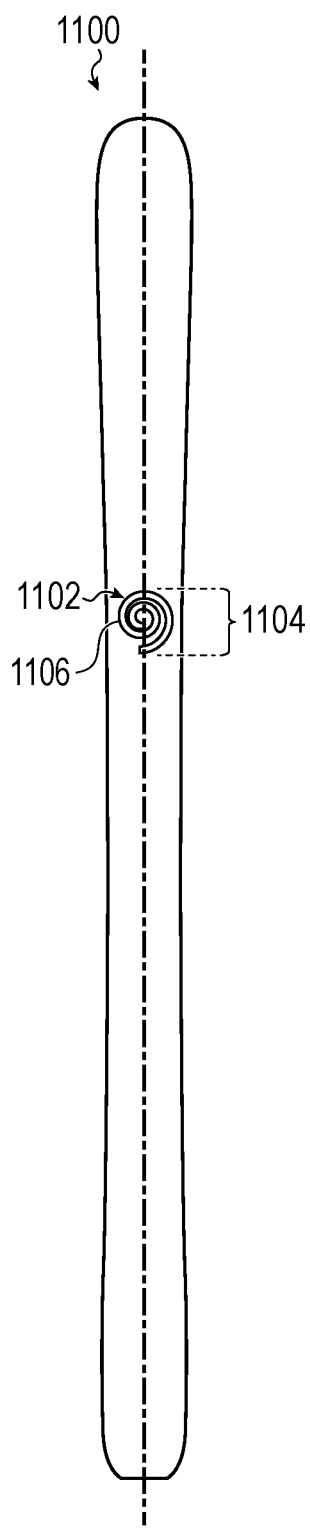
FIG. 11 depicts an example of an improved ski incorporating an inductive charger formed from a reinforcement layer of the ski.

While FIG. 10 illustrates a wireless charger 1006 as a standalone element positioned within the keyhole 1002 of the ski 1000, it is possible to form the wireless charger from a metal layer (or other conductive layer) of the ski itself in which the keyhole is formed. FIG. 11 illustrates this. Here, an inductive charger 1106 is again positioned within a keyhole 1102 of a ski 1100. Unlike the embodiment of FIG. 10, the inductive charger 1106 is formed from, and integral with, the metal reinforcement layer in which the keyhole 1102 is formed. This embodiment simplifies manufacturing and saves material by using the conductive material of the reinforcement layer to form the inductive charger as that material would otherwise be sacrificed to create the keyhole 1102. As with other embodiments, the benefits provided by the keyhole 1102 to the overall ski 1100 remain.

Figure 12:
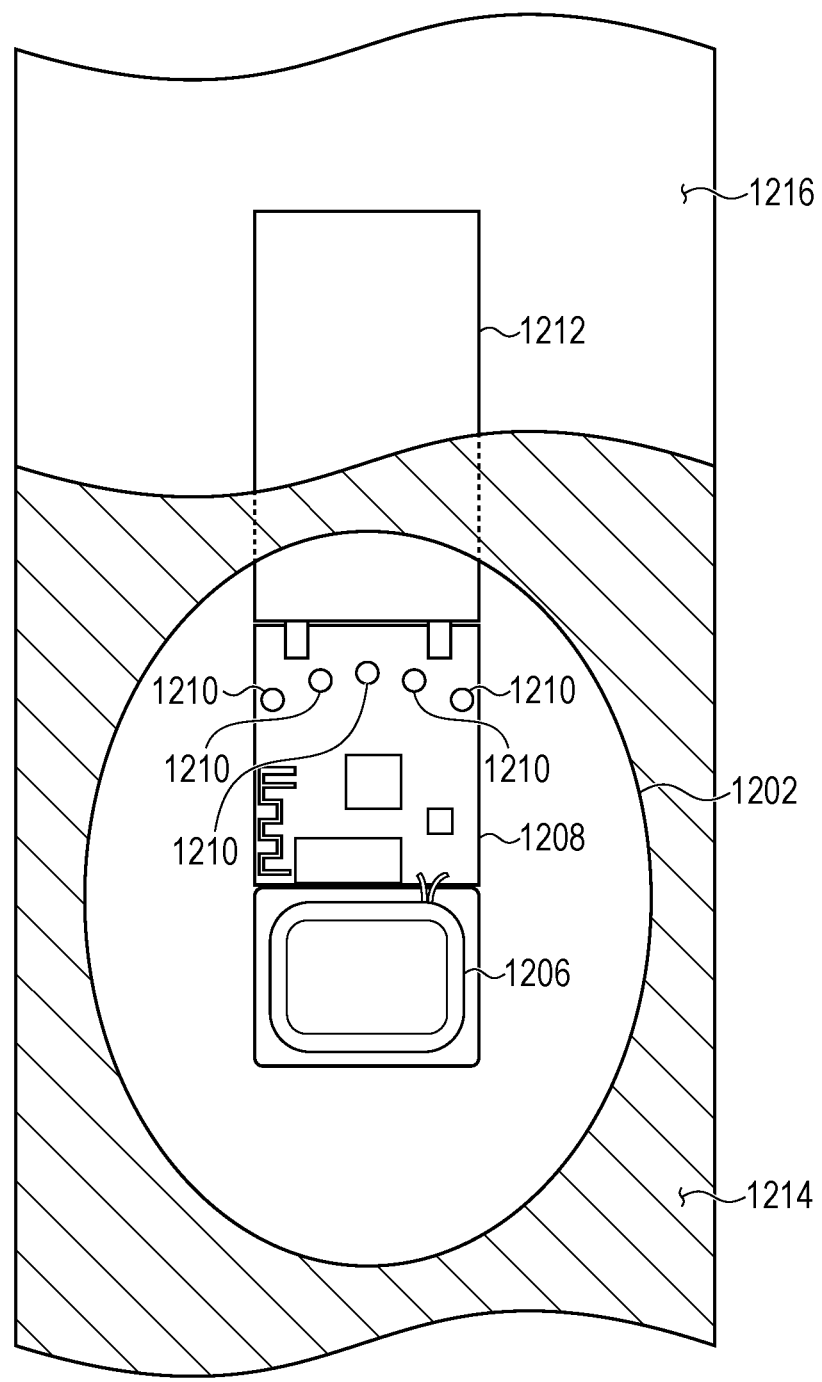
FIG. 12 is a detail view of a ski incorporating a tracking device at least partially in an aperture of a reinforcement layer of the ski.

FIG. 12 shows a detailed view of an example tracking device within the ski taken along line 12-12 of FIG. 10. In some embodiments, the tracking device includes a wireless charger 1206, circuitry 1208, and a battery 1212 operably coupled to the circuitry 1208. As depicted, the tracking device is positioned partially in the keyhole 1202 and partially within other layers (e.g., core) of the ski. For example, as discussed above, the wireless charger 1206 and the circuitry 1208 are fully or partially within the keyhole 1202. Other components, such as the battery 1212, can be positioned outside of the keyhole for protection. For example, the battery 1212 can be positioned within a cavity or pocket of the core layer underneath the reinforcement layer. While the tracking device is shown as a unitary element, the wireless charger 1206, circuitry 1208, and the battery 1212 may be disassembled to allow for servicing of the components. In other embodiments, the tracking device is encased in epoxy to protect the components from damage. The tracking device may be in the order of 1 mm thick, 2 mm thick, 5 mm thick, 10 mm thick, 25.4 mm thick, and so on.

In some embodiments, the circuitry 1208 includes an array of lights 1210. The array of lights may be visible to a user through the top layers of the ski. For example, the top layer may be formed from a partially opaque, a transparent material, and so on, to allow the array of lights 1210 to be visible. This array of lights can be used to convey messages to the user, such as blinking for pairing with a mobile device, lights on to find the skis more easily, a battery level indicator, and so on. The circuitry may also include other user-location features, such as a speaker that produces a sound when the user is nearby, a vibration module that vibrates to alert the user of the ski location, and so on. In some embodiments, the circuitry 1208 includes a short-range wireless technology module, such as Bluetooth, which is operable to connect to other electronic devices to enable users to locate the ski. The tracking device may employ radio technology that uses low energy levels for short-range communications and transmits information across a wide bandwidth. In this configuration, the tracking device may have a long battery life, such as 1 month, 3 months, 6 months, 9 months, or the like. While short-range wireless technologies are described, the device may also include other tracking technologies, as may be known to one of skill in the art, such as near-field communication, Global Positioning System (GPS), and so on.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A ski, defining a body having a tail and a tip, the ski comprising:
   a tip;
   a tail opposite the tip;
   a top sheet;
   a base extending from the tip to the tail and opposite the top sheet;
   a core layer centrally positioned between the base and the top sheet; and
   a reinforcement layer positioned between the top sheet and the core layer, the reinforcement layer defining an aperture extending therethrough and positioned within a first third of a length of the ski, the length defined from the tip to the tail, wherein:
      the aperture is free of any stiffener extending from any other layer; and
      a central axis of the aperture is aligned with a central axis of the body.

2. The ski of claim 1, wherein the aperture is an ellipse.

3. The ski of claim 1, wherein the reinforcement layer is an aluminum alloy comprising zinc and magnesium.

4. The ski of claim 1, wherein:
   the aperture is a first aperture; and
   the core layer defines a second aperture extending at least partially through the core layer.

5. The ski of claim 1, wherein the aperture is a first aperture and the reinforcement layer is a first reinforcement layer and further comprising:
   a second reinforcement layer defining a second aperture extending at least partially through the second reinforcement layer.

6. The ski of claim 5, wherein:
   the second aperture extends through the second reinforcement layer;
   a third aperture extends through the core layer; and
   the first, second, and third aperture are aligned with respect to a vertical axis along a thickness of the body.

7. The ski of claim 1, wherein a distance between the tip of the ski and a center of the aperture is larger than a distance between a boot center of the ski to the center of the aperture.

8. A ski comprising:
   a body defining a body central axis and comprising:
      a tip;
      a tail opposite the tip;
      a length extending from the tip to the tail;
      a boot region located in a middle third of the length;
      a core layer central to the body with respect to a vertical axis of the ski and defining a first thickness;
      at least one laminate layer;
      a first reinforcement layer positioned on a first side of the core layer, the first reinforcement layer defining:
         a second thickness less than the first thickness; and
         an aperture positioned within a front third of the length and free of any stiffener from any other layer and defining an aperture central axis that is aligned with the body central axis; and
      a second reinforcement layer positioned on a second side of the core layer, the second side opposite the first side.

9. The ski of claim 8, wherein the aperture is a through aperture.

10. The ski of claim 9, wherein:
    the aperture is at least partially oval.

11. The ski of claim 9 wherein the aperture is an hourglass shape internal to the first reinforcement layer.

12. The ski of claim 8 wherein:
    the aperture is a first aperture;
    the first reinforcement layer defines a second aperture positioned between the tip and the first aperture; and
    the first and second apertures are symmetrical about a center axis of the body.

13. The ski of claim 12 wherein a first surface area of the first aperture is larger than a second surface area of the second aperture.

14. The ski of claim 8 wherein the aperture is a circle.

15. The ski of claim 8 wherein the first and second reinforcement layers have a yield strength exceeding 600 MPa.

16. The ski of claim 8 wherein the core layer comprises poplar and paulownia.

17. The ski of claim 16 wherein the aperture is an ellipse defining a major axis and a minor axis, and the major axis of the aperture is aligned with a central axis of the body.

18. A reinforcement layer of a ski comprising:
    a monolithic body of the reinforcement layer extending along a length of the ski, the monolithic body comprising a metal material and defining:
       a tip of the ski;
       a tail of the ski;
       a boot center of the ski;
       an aperture positioned between the tip and the boot center, the aperture reducing a bending and torsional stiffness of the ski at the aperture;
       a first tapered feature having a first narrow end at the tip; and
       a second tapered feature having a second narrow end at the tail.

19. The reinforcement layer of claim 18 wherein the reinforcement layer has a thickness between 0.3 mm and 1 mm.

* * * * *